(12) United States Patent
Kim et al.

(10) Patent No.: US 7,634,273 B2
(45) Date of Patent: Dec. 15, 2009

(54) HYBRID WIRED AND WIRELESS COMMUNICATION DEVICE AND A WIRED AND WIRELESS COMMUNICATION METHOD THEREOF

(75) Inventors: Jin-hyung Kim, Gyeonggi-do (KR); Seung-soo Oak, Gyeonggi-do (KR); Jin-tack Lee, Seoul (KR); Sung-hoon Bae, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 10/795,236

(22) Filed: Mar. 9, 2004

(65) Prior Publication Data

US 2004/0224642 A1 Nov. 11, 2004

(30) Foreign Application Priority Data

| Apr. 22, 2003 | (KR) | ...................... 10-2003-0025527 |
| Nov. 12, 2003 | (KR) | ...................... 10-2003-0079912 |
| Dec. 11, 2003 | (KR) | ...................... 10-2003-0090039 |

(51) Int. Cl.
*H04W 40/00* (2009.01)

(52) U.S. Cl. .................. 455/445; 455/74.1; 455/554.2; 455/552.1; 455/41.2; 370/252; 370/254; 370/245

(58) Field of Classification Search ................. 370/252, 370/254, 245; 455/566, 575.1, 434, 232, 455/74.1, 554.2, 41.2, 445, 552.1

See application file for complete search history.

(56) References Cited

U.S. PATENT DOCUMENTS

| 5,572,528 A | | 11/1996 | Shuen ...................... 370/85.13 |
| 5,861,822 A | * | 1/1999 | Park et al. ...................... 341/22 |
| 6,169,789 B1 | * | 1/2001 | Rao et al. .............. 379/110.01 |
| 7,035,633 B2 | * | 4/2006 | Kirkpatrick ............... 455/426.1 |
| 2002/0176366 A1 | * | 11/2002 | Ayyagari et al. ............ 370/245 |

(Continued)

FOREIGN PATENT DOCUMENTS

CN 1195801 10/1998

(Continued)

OTHER PUBLICATIONS

Korean Official Action issued on Aug. 20, 2005, for Korean Patent Application No. 10-2003-0079912.

(Continued)

*Primary Examiner*—Dwayne Bost
*Assistant Examiner*—Pierre-Louis Desir
(74) *Attorney, Agent, or Firm*—Stanzione & Kim, LLP

(57) ABSTRACT

A hybrid wired and wireless communication device and a wired and wireless communication method thereof. The wired and wireless communication method includes determining whether a wired communication module has been linked to a wired communication network, setting a wireless communication operating mode of a wireless communication module to an infrastructure mode when it is determined that the wired communication module has not been linked to the wired communication network, and setting the wireless communication operating mode to an ad-hoc mode when it is determined that the wired communication module has been linked to the wired communication network. Therefore, the wireless communication operating mode is automatically set according to whether the wired communication network has been linked to the wired communication module, thereby increasing a user's convenience.

21 Claims, 7 Drawing Sheets

U.S. PATENT DOCUMENTS

| | | | |
|---|---|---|---|
| 2002/1017636 | * | 11/2002 | Ayyagari et al. ............ 370/245 |
| 2003/0142631 A1 | * | 7/2003 | Silvester .................... 370/252 |
| 2004/0067782 A1 | * | 4/2004 | Kagan et al. ............. 455/575.1 |

FOREIGN PATENT DOCUMENTS

| | | |
|---|---|---|
| EP | 1241838 A2 | 9/2002 |
| KR | 1999-41237 | 6/1999 |
| KR | 2002-28479 | 4/2002 |
| WO | WO 02/067517 | 8/2002 |

OTHER PUBLICATIONS

Korean Office Action issued on Nov. 18, 2005 in corresponding Korean application.

Chinese Office Action dated Jan. 12, 2007 issued in CN 200410034661.2.

* cited by examiner

HYBRID WIRED AND WIRELESS COMMUNICATION DEVICE AND A WIRED AND WIRELESS COMMUNICATION METHOD THEREOF

CROSS-REFERENCE TO RELATED APPLICATIONS

This application claims the priority of Korean Patent Application Nos. 2003-25527, 2003-79912 and 2003-90039, filed on Apr. 22, 2003, Nov. 12, 2003 and Dec. 11, 2003, respectively, in the Korean Intellectual Property Office, the disclosures of which are incorporated herein by reference.

BACKGROUND OF THE INVENTION

1. Field of the Invention

The present invention relates to a hybrid wired and wireless communication device allowing wired and wireless communication, and more particularly, to a hybrid wired and wireless communication device capable of automatically setting an operating mode according to a wired or wireless communication environment, and a wired and wireless communication method thereof.

2. Description of the Related Art

A hybrid wired and wireless communication device includes both of a wired communication module and a wireless communication module in order to communicate by wire and wirelessly with other communication devices. Here, wireless communication operating modes of the wireless communication module are largely divided into an infrastructure mode and an ad-hoc mode. The ad-hoc mode is also referred to as a peer-to-peer mode.

FIG. 1 illustrates a network in the infrastructure mode. The network includes wired communication devices 30, 32, and 34, wireless communication devices 38 and 40, and an access point (AP) 36.

In FIG. 1, for wireless communication, the wireless communication devices 38 and 40 are wirelessly linked to the AP 36 and communicate with the wired communication devices 30, 32, and 34 via the AP 36. Meanwhile, the wired communication devices 30, 32, and 34 communicate by wire with one another. As described above, a mode in which a communication device does not directly communicate with another wired or wireless communication device, but instead communicates with another wired or wireless communication device via the AP 36 constructed on a wired local area network (LAN) 39 is referred to as the infrastructure mode.

FIG. 2 illustrates a network in the ad-hoc mode. The network includes wireless communication devices 50, 52, and 54.

In FIG. 2, for wireless communication, the wireless communication devices 50, 52, and 54 directly and wirelessly communicate with one another without using a wireless relay device such as the AP 36 shown in FIG. 1. As described above, a mode in which a communication device directly and wirelessly communicates with another communication device without requiring relay of, for example, the AP 36, is referred to as the ad-hoc mode.

A communication device shown in FIG. 1 or FIG. 2 may be a personal computer (PC), a notebook computer, a personal digital assistant (PDA), a server, or a peripheral device such as a printer, a scanner, or a video camera.

Wireless communication operating modes, the infrastructure mode and the ad-hoc mode, are set and operated according to a user's option. Conventionally, it is very inconvenient for a user to manually change the wireless communication operating mode of a hybrid wired and wireless communication device. In addition, a user who is not familiar with a computer may feel uncomfortable in changing the wireless communication operating mode.

Meanwhile, when hybrid wired and wireless communication devices are connected to a wired communication network and are in the ad-hoc mode, wired communication can be performed by wired communication modules and wireless communication can also be performed by wireless communication modules. However, when the hybrid wired and wireless communication devices connected to the wired communication network are in the infrastructure mode, data received and transmitted by an AP is transmitted to the wired communication devices 30, 32, and 34 and the wireless communication devices 38 and 40 through the wired LAN 39 and is also transmitted to the wired communication devices 30, 32, and 34 and the wireless communication devices 38 and 40 wirelessly. In other words, the hybrid wired and wireless communication devices redundantly transmit or receive the same data by wire and wirelessly in the infrastructure mode. Accordingly, a hybrid wired and wireless communication device uses only the wire transmitted and received data that has less transmission errors than the wirelessly received data and deletes the wirelessly transmitted and received data. Consequently, redundant data transmission and reception wastes resources of a network environment. Moreover, since the same data is received redundantly, deletion of duplicate data is required, which results in a waste of power. The waste of the resources of the network environment and the waste of power cause the performance of a hybrid wired and wireless communication device to deteriorate.

SUMMARY OF THE INVENTION

Accordingly, it is an aspect of the present invention to provide a wired and wireless communication method used with a hybrid wired and wireless communication device capable of automatically setting a wireless communication operating mode according to whether a wired communication module is linked to a wired communication network.

It is another aspect of the present invention to provide a wired and wireless communication method used with a hybrid wired and wireless communication device which deactivates a wireless communication module when a wired communication module is linked to a wired communication network in an infrastructure mode.

It is yet another aspect of the present invention to provide a hybrid wired and wireless communication device capable of automatically setting a wireless communication operating mode according to whether a wired communication module is linked to a wired communication network.

It is still another aspect of the present invention to provide a hybrid wired and wireless communication device which deactivates a wireless communication module when a wired communication module is linked to a wired communication network in an infrastructure mode.

Additional aspects and/or advantages of the invention will be set forth in part in the description which follows and, in part, will be obvious from the description, or may be learned by practice of the invention.

The foregoing and/or other aspects of the present invention are achieved by providing a wired and wireless communication method used with a hybrid wired and wireless communication device which can communicate by wire and wirelessly, the method including: determining whether a wired communication module has been linked to a wired communication network, setting a wireless communication operating mode of a wireless communication module to an infrastructure mode when it is determined that the wired communication module has not been linked to the wired communication network, and setting the wireless communication operating mode to an ad-hoc mode when it is determined that the wired communication module has been linked to the wired communication network.

The foregoing and/or other aspects of the present invention are also achieved by providing a wired and wireless communication method used with a hybrid wired and wireless communication device which can communicate by wire and wirelessly, the method including: determining whether a wireless communication operating mode has been set to an infrastructure mode, determining whether a wired communication module has been linked to a wired communication network when it is determined that the wireless communication operating mode has been set to the infrastructure mode, and deactivating a wireless communication module when it is determined that the wired communication module has been linked to the wired communication network.

The foregoing and/or other aspects of the present invention are also achieved by providing a hybrid wired and wireless communication device which can communicate by wire and wirelessly, the device including: a wired communication network link check unit which checks whether a wired communication module has been linked to a wired communication network, and a mode setting unit which sets a wireless communication operating mode of a wireless communication module to an infrastructure mode or an ad-hoc mode.

The foregoing and/or other aspects of the present invention are achieved by providing a hybrid wired and wireless communication device which can communicate by wire and wirelessly, the device including: a wired communication network link check unit which checks whether a wired communication module has been linked to a wired communication network, and a wireless communication module activating unit which activates or deactivates a wireless communication module.

The foregoing and/or other aspects of the present invention are also achieved by providing a hybrid wired and wireless communication method used with a hybrid wired and wireless communication device which can communicate by wire and wirelessly, the hybrid wired and wireless communication method comprising determining a state of a wired communication module; and setting a wireless communication operating mode of a wireless communication module to one of plural communication operating modes depending on the determined state of the wired communication module.

The foregoing and/or other aspects of the present invention are also achieved by providing a hybrid wired and wireless communication device which can communicate by wire and wirelessly, the hybrid wired and wireless communication device comprising a wired communication network link check unit which checks the state of a wired communication module and outputs a check result as a link check signal; and a mode setting unit which sets a wireless communication operating mode of a wireless communication module to one of plural communication operating modes in response to the output link check signal.

The foregoing and/or other aspects of the present invention are also achieved by providing a user interface unit comprising a user interface screen to display plural operating modes of a hybrid wired and wireless communication device; and a panel to enable setting of a wireless communication operating module of the hybrid wired and wireless communication device to one of an ad-hoc mode, an infrastructure mode and an automatic selection mode.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
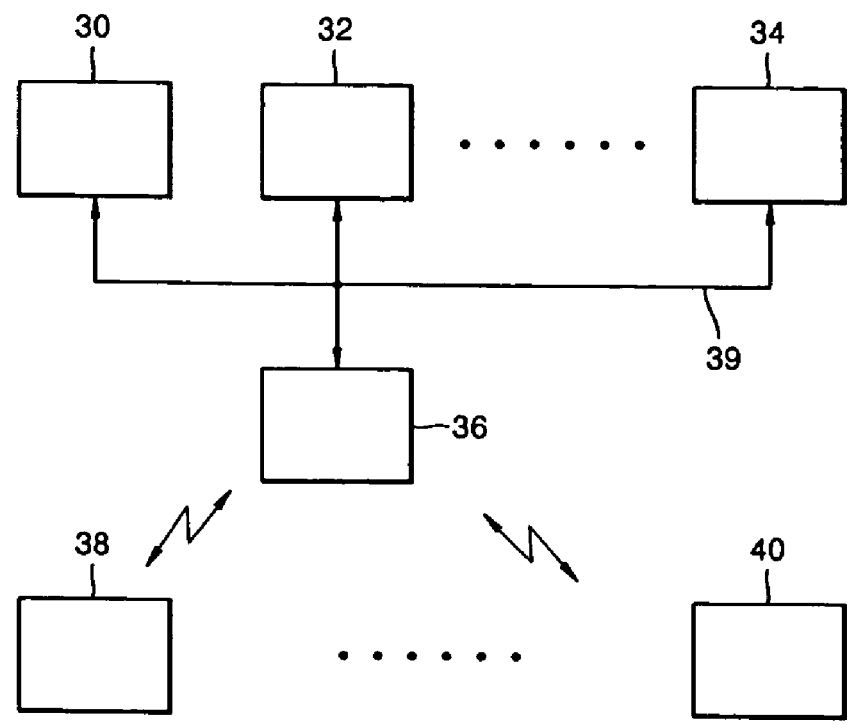
FIG. 1 illustrates a network in an infrastructure mode.
Figure 2:
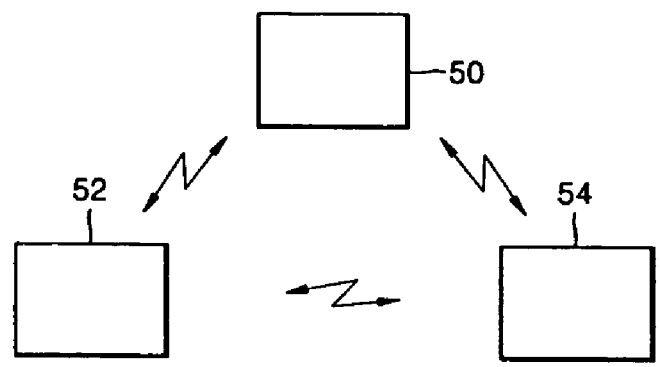
FIG. 2 illustrates a network in an ad-hoc mode.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
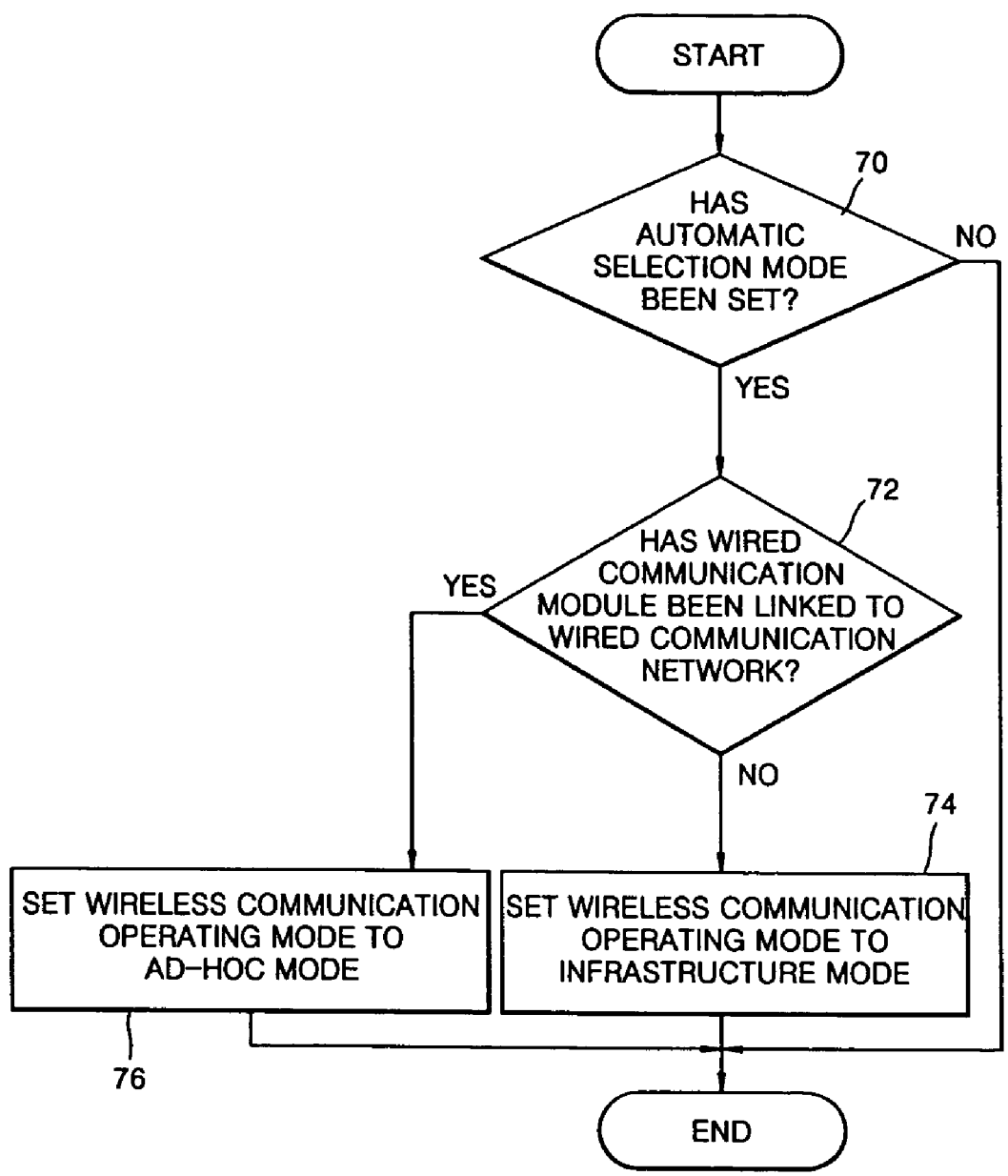
FIG. 3 is a flowchart of a wired and wireless communication method used with a hybrid wired and wireless communication device, according to an embodiment of the present invention.

FIG. 3 is a flowchart of a wired and wireless communication method used with a hybrid wired and wireless communication device (see FIG. 9), according to an embodiment of the present invention. The wired and wireless communication method includes setting a wireless communication operating mode of a wireless communication module according to whether a wired communication module is linked to a wired communication network in operations 70 through 76.

The hybrid wired and wireless communication device performing the wired and wireless communication method of the present invention wirelessly communicates with at least one other communication device through a wireless communication module or communicates by wire with at least one other communication device through a wired communication module linked to a wired communication network, e.g., a local area network (LAN).

The setting of the wireless communication module is checked to determine whether the wireless communication operating mode has been set to an automatic selection mode in operation 70. The wireless communication operating mode can be set to an infrastructure mode, an ad-hoc mode, or an automatic selection mode. The automatic selection mode allows the wireless communication module to be automatically set to one of the infrastructure mode and the ad-hoc mode according to whether the wired communication module is linked to a wired communication network.

Figure 4:
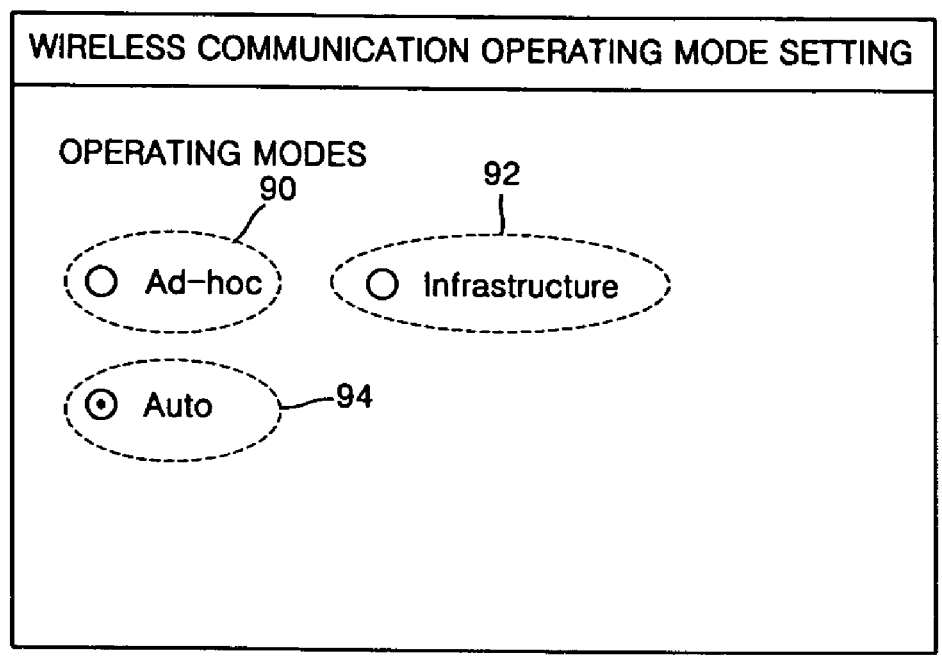
FIG. 4 is a diagram of an example of a user interface screen provided to a user so that the user can set a wireless communication operating mode.

FIG. 4 is a diagram of an example of a user interface screen provided to a user so that the user can set a wired communication operating mode. When the user interface screen shown in FIG. 4 is displayed to a user, the user can set the wireless communication operating mode, in which the wireless communication module will operate, to an ad-hoc mode 90, an infrastructure mode 92, or an automatic selection mode 94.

When it is determined that the wireless communication operating mode has not been set to the automatic selection mode, the wired and wireless communication method ends. However, when it is determined that the wireless communication operating mode has been set to the automatic selection mode, it is determined whether the wired communication module has been linked to a wired communication network in operation 72. To determine whether the wired communication module has been linked to the wired communication network, a physical-layer device chip managing communication of the wired communication network is used. The physical-layer device chip determines whether communication can be performed in a hub, a switch, or a physical layer connected to the wired communication network. When the wired communication module is linked to the wired communication network, the physical-layer device chip recognizes the wired communication network as being in a link-on state. When the wired communication module is not linked to the wired communication network, the physical-layer device chip recognizes the wired communication network as being in a link-off state.

When it is determined that the wired communication module has not been linked to the wired communication network, the wireless communication operating mode of the wireless communication module is set to the infrastructure mode in operation 74. However, when it is determined that the wired communication module has been linked to the wired communication network, the wireless communication operating mode of the wireless communication module is set to the ad-hoc mode in operation 76. In this situation, the hybrid wired and wireless communication device communicates by wire with other communication devices through the wired communication module linked to the wired communication network and wirelessly communicates with other communication devices through the wireless communication module. An illustration of this is provided at FIG. 9, to be discussed in more detail infra.

In other embodiments of the present invention, operation 70 shown in FIG. 3 may be omitted. In this situation, the wireless communication operating mode is automatically set to the infrastructure mode or the ad-hoc mode in the automatic selection mode.

In other embodiments of the present invention, operation 72 may be performed in the initial state of the hybrid wired and wireless communication device or may be periodically performed during run-time of the hybrid wired and wireless communication device.

As described above, while the hybrid wired and wireless communication device is linked to a wired communication network, if the wireless communication module is automatically set to the ad-hoc mode allowing peer-to-peer communication, the hybrid wired and wireless communication device can perform wired communication with other communication devices through the wired communication network and also perform direct wireless communication with other communication devices through the wireless communication module. If the wireless communication module is set to the infrastructure mode while the hybrid wired and wireless communication device is linked to the wired communication network, communication resources are unnecessarily wasted. In other words, once the wired communication module is linked to the wired communication network, the infrastructure mode for link to further another communication network is not necessary. To prevent this unnecessary waste of resources, in the present invention, the wireless communication module is automatically set to the ad-hoc mode when the wired communication module is linked to a wired communication network.

Figure 5:
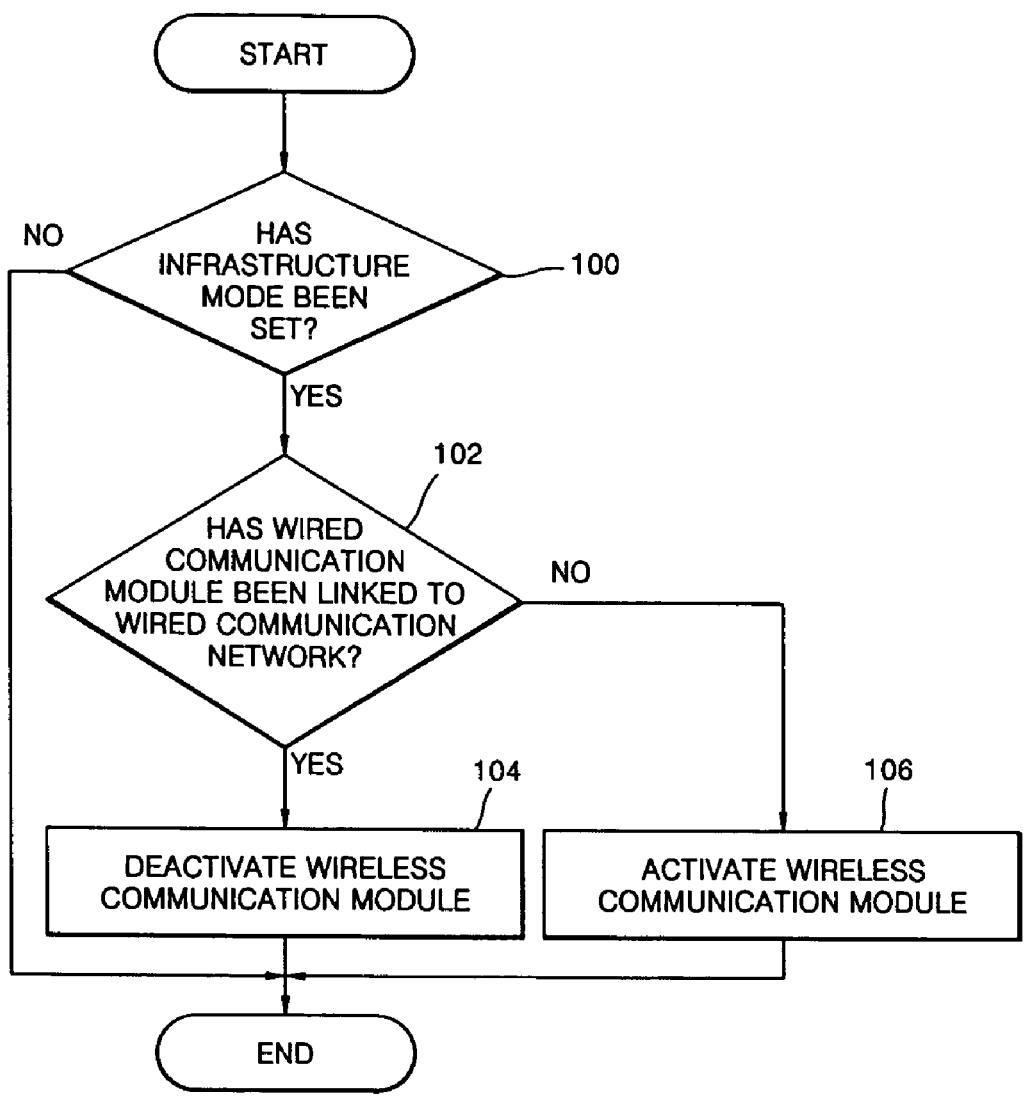
FIG. 5 is a flowchart of a wired and wireless communication method used with a hybrid wired and wireless communication device, according to another embodiment of the present invention.

FIG. 5 is a flowchart of a wired and wireless communication method used with a hybrid wired and wireless communication device, according to another embodiment of the present invention. In this embodiment, the wired and wireless communication method includes deactivating a wireless communication module when it is determined that a wired communication module has been linked to a wired communication network in a state where a wireless communication operating mode has been set to an infrastructure mode in operations 100 through 106.

It is determined whether the wireless communication operating mode has been set to the infrastructure mode in operation 100. A user can set the wireless communication operating mode, in which the wireless communication module will operate, to an ad-hoc mode or an infrastructure mode on the user interface screen shown in FIG. 4. Accordingly, in operation 100, it is determined whether the wireless communication operating mode set by the user is the ad-hoc mode or the infrastructure mode.

When it is determined that the wireless communication operating mode has not been set to the infrastructure mode, the wired and wireless communication method ends. However, when it is determined that the wireless communication operating mode has been set to the infrastructure mode, it is determined whether the wired communication module has been linked to the wired communication network in operation 102. To determine whether the wired communication module has been linked to the wired communication network, a physical-layer device chip managing communication of the wired communication network is used, as described above.

When it is determined that the wired communication module has been linked to the wired communication network, the wireless communication module is deactivated in operation 104. The wireless communication module can be deactivated in various ways. Firstly, the wireless communication module can be deactivated by blocking a medium access control (MAC) port of the wireless communication module. For example, if a hybrid wired and wireless communication device using a universal serial bus (USB) wireless communication module commands the USB wireless communication module to deactivate a MAC port through a USB, the USB wireless communication module deactivates the MAC port in response to the command. Secondly, the wireless communication module can be deactivated by interrupting power supplied to the wireless communication module. For example, if the hybrid wired and wireless communication device interrupts power supplied to the wireless communication module, the wireless communication module cannot operate.

When the wired communication module is linked to the wired communication network in a state where the wireless communication operating mode has been set to the infrastructure mode, data can be received through the wired communication network. Accordingly, receiving the data through the wireless communication module is not necessary. In this situation, if the wireless communication module is deactivated, the wireless communication module cannot receive data. As a result, deletion of redundant data is not required, thereby preventing waste of power and resources of the wireless communication module.

However, when it is determined that the wired communication module has not been linked to the wired communication network, the wireless communication module is activated in operation 106.

If the wired communication module is not linked to the wired communication network in a state where the wireless communication operating mode has been set to the infrastructure mode, the hybrid wired and wireless communication device cannot receive data through the wired communication network but receives data wirelessly only through an access point (AP) connected to the wired communication network. Accordingly, data is not redundantly received even though the wireless communication operating mode is set to the infrastructure mode. Therefore, the wireless communication module is activated to construct a network environment in which data can be received through the wireless communication module.

If it is determined that the wired communication module has not been linked to the wired communication network in a state where the wireless communication module has been activated, the wireless communication module remains activated.

Figure 6:
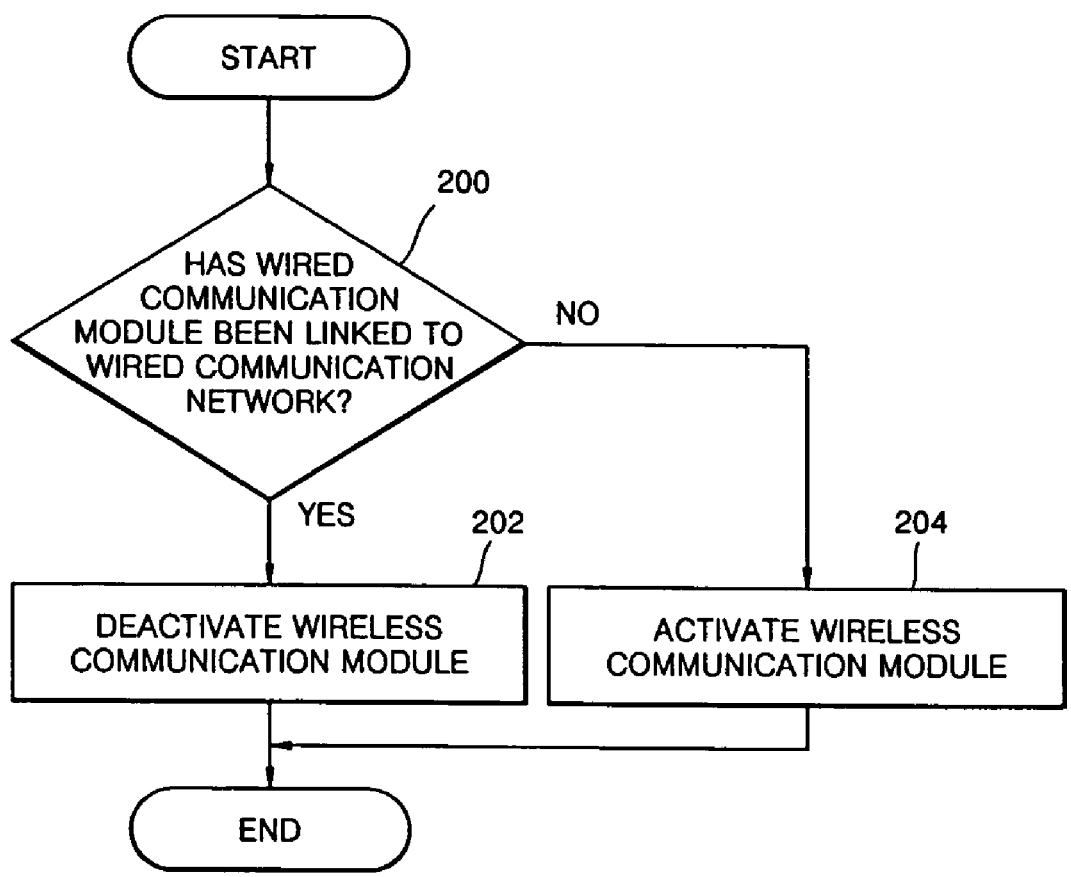
FIG. 6 is a flowchart of a wired and wireless communication method used with a hybrid wired and wireless communication device, according to still another embodiment of the present invention.

FIG. 6 is a flowchart of a wired and wireless communication method used with a hybrid wired and wireless communication device, according to still another embodiment of the present invention. In this embodiment, the wired and wireless communication method includes deactivating or activating a wireless communication module according to a result of determining whether a wired communication module has been linked to a wired communication network in operations 200 through 204.

It is determined whether the wired communication module has been linked to the wired communication network in operation 200. To determine whether the wired communication module has been linked to the wired communication network, a physical-layer device chip managing communication of the wired communication network is used, as described above.

When it is determined that the wired communication module has been linked to the wired communication network, the wireless communication module is deactivated in operation 202. The wireless communication module can be deactivated in various ways, as described above. When the wired communication module is linked to the wired communication network, data can be transmitted and received only by wire. In other words, since the wireless communication module is deactivated, data cannot be received through wireless communication.

However, when it is determined that the wired communication module has not been linked to the wired communication network, the wireless communication module is activated in operation 204. When the wired communication module is not linked to the wired communication network, the hybrid wired and wireless communication device cannot receive data through the wired communication network. In this situation, the hybrid wired and wireless communication device can wirelessly receive data through an AP connected to the wired communication network in the infrastructure mode or can receive data through a wireless LAN in an ad-hoc mode.

Hereinafter, the structure and operations of a hybrid wired and wireless communication device according to the present invention will be described with reference to the attached drawings.

Figure 7:
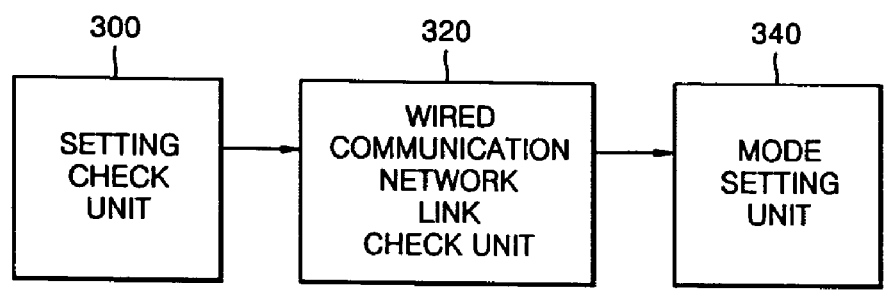
FIG. 7 is a block diagram of a hybrid wired and wireless communication device according to another embodiment of the present invention.

FIG. 7 is a block diagram of a hybrid wired and wireless communication device according to another embodiment of the present invention. In this embodiment, the hybrid wired and wireless communication device includes a setting check unit 300, a wired communication network link check unit 320, and a mode setting unit 340.

For clarity of the description, the hybrid wired and wireless communication device shown in FIG. 7 will be described with reference to FIG. 3 showing a wired and wireless communication method. When the wired and wireless communication method shown in FIG. 3 does not include operation 70, the hybrid wired and wireless communication device may not include the setting check unit 300.

To perform operation 70, the setting check unit 300 checks the setting of a wireless communication operating mode to determine whether the wireless communication operating mode has been set to an automatic selection mode and outputs a check result as a setting check signal to the wired communication network link check unit 320.

To perform operation 72, in response to the setting check signal received from the setting check unit 300, the wired communication network link check unit 320 checks whether the wired communication module has been linked to the wired communication network and outputs a check result as a link check signal to the mode setting unit 340.

To perform operations 74 and 76, the mode setting unit 340 sets the wireless communication operating mode to an infrastructure mode or an ad-hoc mode in response to the link check signal received from the wired communication network link check unit 320. Consequently, the wireless communication module of the hybrid wired and wireless communication device performs wireless communication in a mode set by the mode setting unit 340. For example, when it is determined that the wired communication module has been linked to the wired communication network based on the link check signal received from the wired communication network link check unit 320, the mode setting unit 340 sets the wireless communication operating mode to the ad-hoc mode. However, when it is determined that the wired communication module has not been linked to the wired communication network based on the link check signal received from the wired communication network link check unit 320, the mode setting unit 340 sets the wireless communication operating mode to the infrastructure mode.

Figure 8:
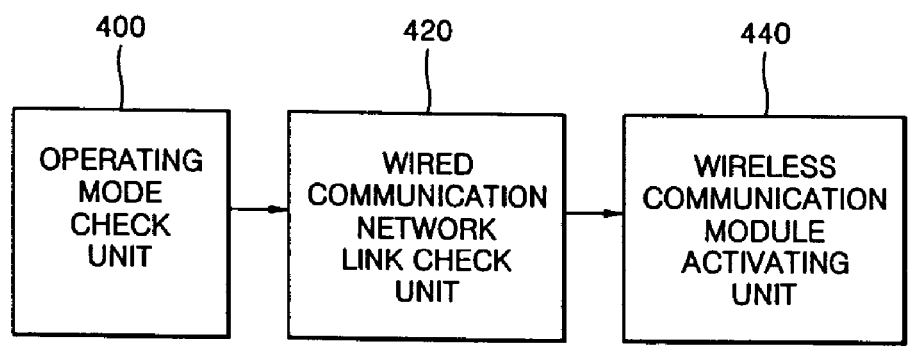
FIG. 8 is a block diagram of a hybrid wired and wireless communication device according to another embodiment of the present invention.

FIG. 8 is a block diagram of a hybrid wired and wireless communication device according to another embodiment of the present invention. In this embodiment, the hybrid wired and wireless communication device includes an operating mode check unit 400, a wired communication network link check unit 420, and a wireless communication module activating unit 440.

For clarity of the description, the hybrid wired and wireless communication device shown in FIG. 8 will be described with reference to FIG. 5 showing the wired and wireless communication method thereof. In performing the wired and wireless communication method shown in FIG. 6, the hybrid wired and wireless communication device shown in FIG. 8 may not include the operating mode check unit 400.

To perform operation 100, the operating mode check unit 400 checks whether a wireless communication operating mode has been set to an infrastructure mode or an ad-hoc mode and outputs a check result as an operating mode check signal to the wired communication network link check unit 420.

To perform operation 102, the wired communication network link check unit 420 checks whether a wired communication module has been linked to a wired communication network in response to the operating mode check signal received from the operating mode check unit 400, and outputs a check result as a link check signal to the wireless communication module activating unit 440. The wired communication network link check unit 420 is implemented in a physical chip (not shown) managing communication of the wired communication network. The wired communication network link check unit 420 in the physical chip verifies whether communication can be performed in a hub, a switch, or a physical layer, which is connected to the wired communication network. When the wired communication module has been linked to the wired communication network, the wired communication network link check unit 420 recognizes the wired communication network as being in a link-on state and outputs a link check signal indicating the link-on state to the wireless communication module activating unit 440. However, when the wired communication module has not been linked to the wired communication network, the wired communication network link check unit 420 recognizes the wired communication network as being in a link-off state and outputs a link check signal indicating the link-off state to the wireless communication module activating unit 440.

To perform operations 104 and 106, the wireless communication module activating unit 440 activates or deactivates the wireless communication module in response to the link check signal received from the wired communication network link check unit 420. The wireless communication module activating unit 440 deactivates the wireless communication module by blocking a MAC port of the wireless communication module or by interrupting power supplied to the wireless communication module.

Figure 9:
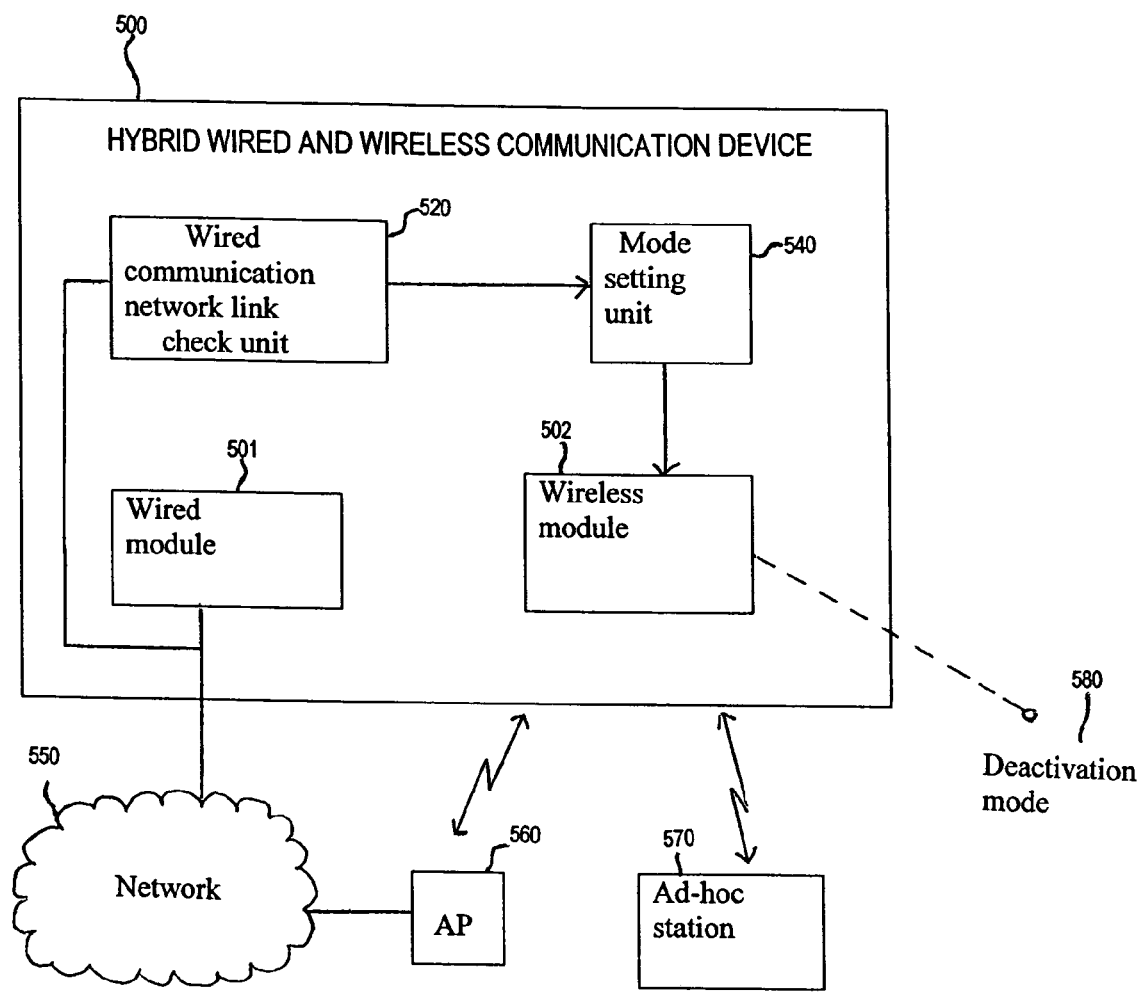
FIG. 9 illustrates a hybrid wired and wireless communication device operating according to the embodiments of the present invention.

FIG. 9 illustrates an example of how a hybrid wired and wireless communication device 500 operation according to the embodiments of the present invention. More specifically, the hybrid wired and wireless communication device 500 includes a wired communication network link checking unit 520, a mode setting unit 500, a wired communication module 501 and a wireless communication module 502. The wired communication network link checking unit 520 checks whether the wired communication module 501 has been linked to a wired communication network 550. When the wired communication module 501 has been linked to the wired communication network 550, the wired communication network link check unit 520 recognizes the wired communication network as being in a link-on state and outputs a link check signal indicating the link-on state to a wireless mode setting unit 540. Here, the wireless communication module 502 is switched to the ad-hoc mode and communicates directly to an ad-hoc station 570.

Alternatively, when the wired communication module 501 has not been linked to the wired communication network 550, the wired communication network link check unit 520 recognizes the wired communication network 550 as being in a link-off state and outputs a link check signal indicating the link-off state to the wireless mode setting unit 540. Here, the wireless communication module 502 is switched to the infrastructure mode, and communicates directly to communication network 550 through an acess point (AP) 560.

As stated previously, the wireless communication module activating unit 540 may also deactivate the wireless communication module 502 by blocking a mac port of the wireless communication module or by interrupting power supplied to the wireless communication module 502, thus placing the wireless communication module 502 into a deactivation state 580.

As described above, in the present invention, an operating mode of a wireless communication module, i.e., a wireless communication operating mode, is automatically set according to whether a wired communication module has been linked to a wired communication network, thereby increasing a user's convenience. In addition, since the wireless communication module is deactivated when the wired communication module has been linked to the wired communication network in an infrastructure mode, data can be prevented from being transmitted and received unnecessarily through wireless communication, and delay of data processing can be prevented. Accordingly, waste of power in a system and waste of resources in a network environment can be prevented.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A wired and wireless communication method used with a hybrid wired and wireless communication device which can communicate by wire and wirelessly, the wired and wireless communication method comprising:

determining whether a wired communication module has been linked to a wired communication network;

setting a wireless communication operating mode of a wireless communication module to an infrastructure mode to wirelessly communicate with communication devices through a wireless relay connected to the wired communication network when it is determined that the wired communication module has not been linked to the wired communication network; and setting the wireless communication operating mode of the wireless communication module to an ad-hoc mode to wirelessly communicate directly with the communication devices when it is determined that the wired communication module has been linked to the wired communication network.

2. The wired and wireless communication method of claim 1, further comprising determining whether the wireless communication operating mode has been set to an automatic selection mode by checking the setting of the wireless communication operating mode and going to the operation of determining whether a wired communication module has been linked to a wired communication network when it is determined that the wireless communication operating mode has been set to the automatic selection mode.

3. The wired and wireless communication method of claim 1, wherein the operation of determining whether a wired communication module has been linked to a wired communication network is performed in an initial state of the hybrid wired and wireless communication device.

4. The wired and wireless communication method of claim 1, wherein the operation of determining whether a wired communication module has been linked to a wired communication network is periodically performed during run-time of the hybrid wired and wireless communication device.

5. The wired and wireless communication method of claim 1, wherein the operation of determining whether a wired communication module has been linked to a wired communication network comprises determining whether the wired communication module has been linked to the wired communication network using a physical-layer device chip managing communication of the wired communication network.

6. The wired and wireless communication method of claim 1, further comprising setting the wireless communication operating mode to an infrastructure mode when it is determined that the wired communication module has not been linked to the wired communication network.

7. A wired and wireless communication method for a hybrid wired and wireless communication device which can communicate by wire and wirelessly, the wired and wireless communication method comprising:
  determining whether a wireless communication operating mode has been set to an automatic selection mode by checking the setting of the wireless communication operating mode;
  determining whether a wired communication module has been linked to wired communication network when it is determined that the wireless communication operating mode has been set to the automatic selection mode; and
  setting the wireless communication operating mode to an ad-hoc mode to wirelessly communicate directly with communication devices upon the determining that the wired communication module has been linked to the wired communication network.

8. A wired and wireless communication method used with a hybrid wired and wireless communication device which can communicate by wire and wirelessly, the wired and wireless communication method comprising:
  determining whether a wireless communication operating mode has been set to an infrastructure mode to wirelessly communicate with communication devices through a wireless relay;
  determining whether a wired communication module has been linked to a wired communication network when it is determined that the wireless communication operating mode has been set to the infrastructure mode; and
  deactivating a wireless communication module when it is determined that the wired communication module has been linked to the wired communication network and it is determined that the wireless communication operating mode has been set to the infrastructure mode.

9. The wired and wireless communication method of claim 8, wherein the operation of deactivating a wireless communication module when it is determined that the wired communication module has been linked to the wired communication network comprises deactivating the wireless communication module by blocking a medium access control (MAC) port of the wireless communication module.

10. The wired and wireless communication method of claim 8, wherein the operation of deactivating a wireless communication module when it is determined that the wired communication module has been linked to the wired communication network comprises deactivating the wireless communication module by interrupting power supplied to the wireless communication module.

11. The wired and wireless communication method of claim 8, further comprising activating the wireless communication module when it is determined that the wired communication module has not been linked to the wired communication network.

12. A wired and wireless communication method used with a hybrid wired and wireless communication device which can communicate by wire and wirelessly, the wired and wireless communication method comprising:
  determining whether a wired communication module has been linked to a wired communication network; and
  deactivating a wireless communication module when it is determined that the wired communication module has been linked to the wired communication network and it is determined that the wireless communication module is operating in an infrastructure mode to wirelessly communicate with communication devices through a wireless relay connected to the wired communication network.

13. The wired and wireless communication method of claim 12, further comprising activating the wireless communication module when it is determined that the wired communication module has not been linked to the wired communication network.

14. A hybrid wired and wireless communication device which can communicate by wire and wirelessly, the hybrid wired and wireless communication device comprising:
  a wired communication network link check unit which checks whether a wired communication module has been linked to a wired communication network and outputs a check result as a link check signal; and
  a mode setting unit which sets a wireless communication operating mode of a wireless communication module based on the check result of the link check signal from the wired network link check unit to an infrastructure mode to wirelessly communicate with communication devices through a wireless relay connected to the wired communication network or an ad-hoc mode to wirelessly communicate directly to the communication devices in response to the link check signal such that the wireless communication module wireless communicates with the wired network in the set wireless communication operating mode.

15. The hybrid wired and wireless communication device of claim 14, further comprising a setting check unit which checks the setting of the wireless communication operating mode to determine whether the wireless communication operating mode has been set to an automatic selection mode and outputs a check result as a setting check signal, wherein the wired communication network link check unit checks whether the wired communication module has been linked to the wired communication network in response to the setting check signal.

16. A hybrid wired and wireless communication method used with a hybrid wired and wireless communication device which can communicate by wire and wirelessly, the hybrid wired and wireless communication method comprising:
  determining whether a wired communication module is linked on a network physical layer to a wired network; and
  setting a wireless communication operating mode of the hybrid wired and wireless communication device to an ad-hoc mode to wirelessly communicate directly with communication devices when the wired communication module is linked on the network physical layer to the wired network, and setting the wireless communication operating mode of the hybrid wired and wireless communication device to an infrastructure mode to wirelessly communicate with the communication devices through a wireless relay connected to the wired communication network when the wired communication module is not linked on the network physical layer to the wired network.

17. The hybrid wired and wireless communication method of claim 16, wherein the determining of whether the wired communication module is active comprises at least one of:
  periodically determining whether the wired communication module is linked on the network physical layer to the wired network; and
  determining whether the wired communication module is linked on the network physical layer to the wired network when the hybrid wired and wireless communication device is initially turned on.

18. A hybrid wired and wireless communication device which can communicate by wire and wirelessly, the hybrid wired and wireless communication device comprising:
- a wired communication network link check unit which checks the state of a network physical layer via a wired communication module and outputs a check result as a link check signal; and
- a mode setting unit which sets a wireless communication operating mode of a wireless communication module to one of plural wireless communication operating modes in response to the output link check signal;
- wherein the one of plural communication operating modes includes an infrastructure mode to wirelessly communicate with communication devices through a wireless relay connected to the wired communication network and an ad-hoc mode to wirelessly communicate directly with the communication devices.

19. A user interface unit comprising:
- a user interface screen to display plural operating mode of hybrid wired and wireless communication device; and
- a panel to enable setting of a wireless communication operating module of the hybrid wired and wireless communication device to one of an ad-hoc mode to wirelessly communicate directly with communication devices, an infrastructure mode to wired communication with the communication devices through a wireless relay connected to the wired communication network, and an automatic selection mode, wherein in the automatic selection mode the wireless communication operating module is automatically set to one of the infrastructure mode and the ad-hoc mode based on whether a wired communication module of the hybrid wired and wireless communication device is linked on a network physical layer to a wired network.

20. A hybrid wired and wireless communication device which is capable of communicating by wire and wirelessly, the hybrid wired and wireless communication device comprising:
- a wired communication network link check unit which checks whether a wired communication module is linked on a network physical layer to a predetermined communication network and outputs a check result as a link check signal; and
- a mode setting unit which controls the hybrid wired and wireless device to operate in an infrastructure mode to wirelessly communicate with communication devices through a wireless relay connected to the wired communication network with respect to the predetermined communication network in response to the link check signal when the link check signal indicates a link-off state of the wired communication module and to operate in an ad-hoc mode to wirelessly communicate directly with the communication devices with respect to the predetermined communication network in response to the link check signal when the link check signal indicates a link-on state of the wired communication module.

21. A hybrid wired and wireless communication device which communicates by wire and wirelessly, the hybrid wired and wireless communication device comprising:
- a wired communication module to communicate with a selected wired wired communication network when linked on a network physical layer thereto;
- a wireless communication module to communicate with the selected wired communication network regardless of whether the wired communication module is linked on the network physical layer thereto; and
- a mode setting unit to switch the wireless communication module between an ad hoc communication mode to wirelessly communicate directly with the communication devices and an infrastructure mode to wirelessly communicate with communication devices through a wireless relay connected to the wired communication network based on whether the wired communication module is linked on the network physical layer to the selected wired communication network such that the wireless communication module communicates with the selected wired communication network using the switched communication mode.

* * * * *

UNITED STATES PATENT AND TRADEMARK OFFICE
CERTIFICATE OF CORRECTION

PATENT NO. : 7,634,273 B2   Page 1 of 1
APPLICATION NO. : 10/795236
DATED : December 15, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 50 days.

Signed and Sealed this

Ninth Day of November, 2010

David J. Kappos
*Director of the United States Patent and Trademark Office*